Oct. 30, 1928.
L. G. CLARK
1,689,194
CREVICE MOLDING
Filed Oct. 14, 1926
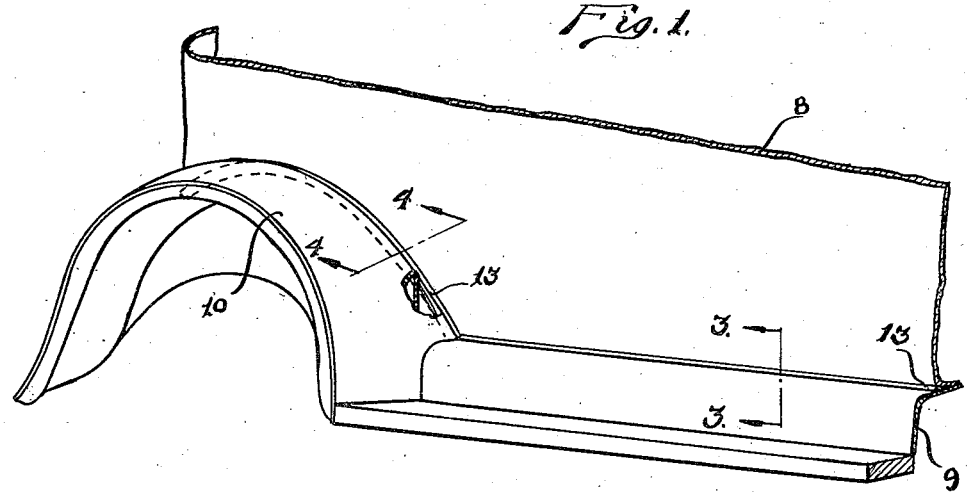
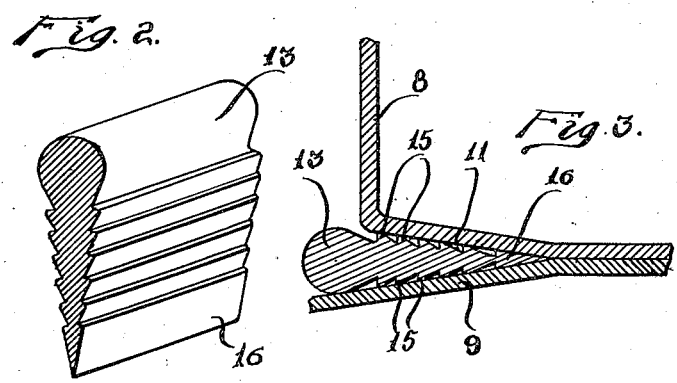
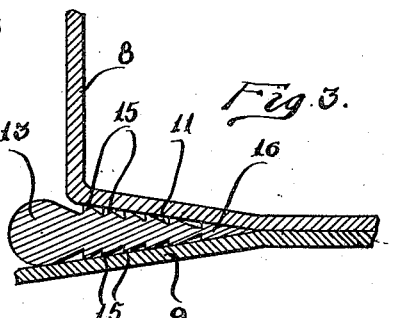
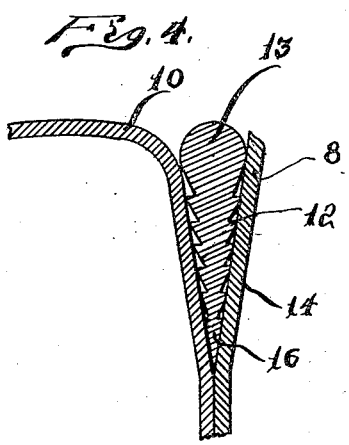
INVENTOR.
Lester G. Clark.
BY
ATTORNEY.

Patented Oct. 30, 1928.

1,689,194

UNITED STATES PATENT OFFICE.

LESTER G. CLARK, OF FERNDALE, MICHIGAN.

CREVICE MOLDING.

Application filed October 14, 1926. Serial No. 141,462.

My invention relates to a new and useful improvement in a crevice molding adapted for use particularly upon automobile bodies, and particularly for mounting on the body between the body panel proper and the dust shield, and between the body panel proper and the fenders, although from the description it will become apparent that the device may be used with equally as desirable results for other purposes.

In the drawings I have shown, however, the invention applied to an automobile body. In the construction of automobile bodies as now carried on, there is left between the inner side of the fender and the body panel proper and between the inner side of the dust shield and the body panel proper a crevice. With some of the manufacturers it is customary to close these crevices by the use of canvas or the like, so that a finished job in appearance may be presented. The use of canvas, however, has proven unsatisfactory in that it quickly deteriorates through the action of the elements, and the finished attractive appearance is soon lost.

To provide a molding adapted for this purpose which will be possessed of the desired durability, while at the same time providing the desired appearance, is an object of this present invention.

Another object is the provision of a molding of this kind which will be simple in structure, economical of manufacture, highly efficient in use, easily applied, and self-affixing when applied.

Another object of the invention is the provision of a molding of this class made from a suitable metal easily bendable into various forms and shapes.

Other objects will appear hereinafter.

The invention consists in the combination and arrangement of parts hereinafter described and claimed.

The invention will be best understood from a reference to the accompanying drawings, which form a part of this specification and in which, Fig. 1 is a fragmentary perspective view of an automobile body showing the invention applied.

Fig. 2 is a fragmentary perspective view of the invention.

Fig. 3 is a fragmentary sectional view taken on line 3—3 of Fig. 1.

Fig. 4 is a fragmentary sectional view taken on line 4—4 of Fig. 1.

Fig. 5 is a fragmentary plan view of a fragment of the invention.

As shown in the drawings the vehicle body is provided with a side panel and a dust shield 9, a fender 10 being also illustrated as attached to the body. As shown in Fig. 3 there is a space 11 between the dust shield 9 and the body panel 8, this space providing a crevice. As shown in Fig. 4 there is also a space or crevice 12 between the body panel 8 and the fender 10. It is to provide a filling for these crevices that the present invention has been designed.

The invention is preferably made from a suitable bendable metal such as aluminum, lead or the like, and comprises a head 13 and a wedge shaped main body 14, the opposite sides of this wedge shaped main body throughout the major portion of its length being provided with corrugations or longitudinally extending teeth 15. These teeth do not extend to the lowermost end of the main body so that there is a smooth surface point 16 on the main body for facilitating entry of the molding into the crevice. It will be noted that the depth of the teeth increases as the approach to the head is made, the teeth adjacent the point being of less depth than the teeth adjacent the head. When the molding is driven into the crevice the teeth or corrugations 15 serve to grip the sides of the bodies between which the teeth engage, so that they serve to resist withdrawal of the molding from operative position.

By forming the molding of an easily bendable material it may be inserted into crevices of various shapes, the material being bendable to conform to the desired shapes so that the molding may be shaped for insertion into the crevices substantially as quickly as though the molding were made from reinforced canvas or the like.

In use it is desirable that this molding be made preferably from non-rustable material so that the ornamental effect produced by the use of the molding will be permanent.

It is believed obvious that this molding may be very easily and quickly manufactured through a rolling process, if desired, and that it will perform the function of filling the crevice and silencing the various parts most efficiently.

While I have illustrated and described the preferred form of structure, I do not wish to limit myself to the precise form of structure shown, but desire to avail myself of such variations and modifications as may come within the scope of the appended claims.

Having thus described my invention, what I claim as new and desire to secure by Letters Patent is:

1. A trim molding adapted for insertion into a crevice comprising an elongated metallic easily bendable wedge shaped body; a head mounted on one edge of said body; and longitudinally extending corrugations on opposite faces of said body.

2. A trim molding of the class described comprising an elongated wedge shaped easily bendable metallic body; a point forming portion on said body; a head on one edge of said body; and corrugations on opposite faces of said body intermediate said point forming portion and said head.

3. A trim molding of the class described comprising an elongated wedge shaped body; a head on one edge of said body, and a plurality of spaced longitudinally extending corrugations on opposite faces of said body.

In testimony whereof I have signed the foregoing.

LESTER G. CLARK.